United States Patent
Tsunashima et al.

(10) Patent No.: US 9,841,070 B2
(45) Date of Patent: Dec. 12, 2017

(54) SADDLE-RIDING TYPE VEHICLE

(71) Applicant: HONDA MOTOR CO., LTD., Minato-Ku, Tokyo (JP)

(72) Inventors: Kosuke Tsunashima, Wako (JP); Hiroyuki Kojima, Wako (JP); Junya Ono, Wako (JP); Tatsuya Ryuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/447,602

(22) Filed: Mar. 2, 2017

(65) Prior Publication Data
US 2017/0268586 A1    Sep. 21, 2017

(30) Foreign Application Priority Data

Mar. 17, 2016 (JP) .................................. 2016-053285

(51) Int. Cl.
*F16D 48/06* (2006.01)
*F02N 11/08* (2006.01)

(52) U.S. Cl.
CPC .......... *F16D 48/06* (2013.01); *F02N 11/0851* (2013.01); *F16D 2500/10412* (2013.01); *F16D 2500/1117* (2013.01); *F16D 2500/3069* (2013.01); *F16D 2500/30806* (2013.01)

(58) Field of Classification Search
CPC .......... F16D 48/06; F16D 2500/10412; F16D 2500/3069; F16D 2500/30806; F16D 2500/50227; F16D 2500/504
See application file for complete search history.

(56) References Cited

U.S. PATENT DOCUMENTS

| 4,984,161 A | 1/1991 | Nakazawa et al. |
| 5,957,797 A | 9/1999 | Hong |

(Continued)

FOREIGN PATENT DOCUMENTS

| EP | 2 695 782 A1 | 2/2014 |
| EP | 2 927 525 A1 | 10/2015 |
| JP | H01-103547 A | 4/1989 |

(Continued)

OTHER PUBLICATIONS

Extended European search report dated Jul. 20, 2017 in the corresponding EP Patent Application 17158843.7.

*Primary Examiner* — Edwin A Young
(74) *Attorney, Agent, or Firm* — Carrier Blackman & Associates, P.C.; Joseph P. Carrier; William D. Blackman (57) ABSTRACT

A saddle-riding type vehicle includes an automatic clutch mechanism configured to be activated by an actuator which enables a push start to be executed, so that even when a charged capacity of a battery is reduced, an engine can be started. A control unit of the vehicle proceeds to a push start control mode when an engine stopped state detection portion detects a stopped state of an engine, a vehicle stopped state detection portion detects a stopped state of the saddle-riding type vehicle, and a gear selected state detection portion detects a state in which any one of gears of a transmission is selected. In the push start control mode, the control unit applies a clutch to start the engine when a vehicle speed detection portion detects a predetermined vehicle speed or faster, and a cutoff switch state detection portion detects a change in state of a cutoff switch.

7 Claims, 6 Drawing Sheets

(56) References Cited

U.S. PATENT DOCUMENTS

2008/0207393 A1* 8/2008 Minami ................ F16D 48/06
477/77
2012/0298466 A1* 11/2012 Nedachi ................ F16D 48/06
192/84.6

FOREIGN PATENT DOCUMENTS

| JP | 2013-177925 A | 9/2013 |
|----|---------------|--------|
| WO | 98/40638 A1 | 9/1998 |

* cited by examiner

SADDLE-RIDING TYPE VEHICLE

CROSS-REFERENCE TO RELATED APPLICATION

This application claims priority from Japanese Patent Application No. 2016-053285 filed on Mar. 17, 2016, the entire contents of which are incorporated herein by reference.

TECHNICAL FIELD

The present invention relates to a saddle-riding type vehicle, and more particularly to a saddle-riding type vehicle having an automatic clutch mechanism which applies and release a clutch automatically.

BACKGROUND ART

As a saddle-riding type vehicle of a prior art, for example, patent literature 1 discloses a motorcycle which includes a "normally open" type automatic clutch mechanism (hereinafter referred to as a normally open clutch) in which a clutch is kept released in its normal state where the clutch is not in operation. In the motorcycle including the automatic clutch mechanism, the clutch is driven to be applied and released by an actuator so as to control the transmission of power of an engine to a tire.

In the motorcycle including the automatic clutch mechanism, when an ignition switch is ON, an engine starter motor rotates a crankshaft to a rotation speed at which the engine can be started, and the engine is started by executing an engine start control (ignition and injection).

The engine starter motor is normally driven by a battery and outputs a driving force which can maintain the engine starting rotation speed when there remains a battery capacity which is good enough to do so. However, when the battery capacity is reduced, the driving force of the engine starter motor is reduced, and the rotation speed of the crankshaft cannot be maintained, resulting in fears that it becomes difficult to start the engine.

To start the engine in these situations, so-called "push start" is executed in which a specific gear (other than the neutral and reverse gears) is engaged and a rear wheel, which is a drive wheel, is rotated to obtain a crankshaft rotation speed at which the engine can be started.

To be specific, the rear wheel, which is the drive wheel, is rotated by a rider pushing the motorcycle, and the clutch is applied in this state to connect the rear wheel to the crankshaft. By doing so, the rotation of the rear wheel is transmitted to the crankshaft, and the engine start control is executed when the rotation speed of the crankshaft is raised to the rotation speed at which the engine can be started.

RELATED ART LITERATURE

Patent Literature

Patent Literature 1: JP-A-2013-177925

SUMMARY OF THE INVENTION

Problem that the Invention is to Solve

In the automatic clutch mechanism in which the clutch is activated by the actuator, however, the clutch cannot be applied and released manually. In the motorcycle including the normally open clutch, since the rotation of the rear wheel cannot be transmitted to the crankshaft as it is, the engine cannot be started.

On the other hand, in a motorcycle including a "normally closed" type automatic clutch mechanism (hereinafter, referred to as a normally closed clutch) in which with the clutch remaining in its normal state where the clutch is not operated, the clutch is kept applied, since a power transmission line from an engine to a rear wheel is kept connected, there may be a situation in which it becomes difficult for the rider to push the motorcycle.

The invention has been made in view of these situations, and an object thereof is to provide a saddle-riding type vehicle including an automatic clutch mechanism configured to be activated by an actuator which enables a push start to be executed, so that even when a charged capacity of a battery is reduced, an engine can be started.

Means for Solving the Problem

With a view to achieving the object, according to an invention of claim 1, there is provided a saddle-riding type vehicle, including:

an engine;

a wheel;

a transmission which is provided on a power transmission line which extends between the engine and the wheel;

a clutch which is released or applied to disconnect or connect the power transmission line;

an actuator which controls the release or application of the clutch; and a control unit which controls the actuator to release or apply the clutch, wherein the control unit includes:

an engine stopped state detection portion which detects a stopped state of the engine;

a vehicle stopped state detection portion which detects a stopped state of the saddle-riding type vehicle;

a gear selected state detection portion which detects a state in which any one of gears of the transmission is selected;

a vehicle speed detection portion which detects a vehicle speed or a vehicle speed related value which is related to a vehicle speed; and a switch state detection portion which detects an ON state or an OFF state of a switch, wherein the control unit proceeds to a push start control mode when the engine stopped state detection portion detects a stopped state of the engine, the vehicle stopped state detection portion detects a stopped state of the saddle-riding type vehicle, and the gear selected state detection portion detects a state in which any one of the gears of the transmission is selected, and wherein in the push start control mode, the control unit applies the clutch to start the engine when the vehicle speed detection portion detects a predetermined vehicle speed or higher, and the switch state detection portion detects a change in state of the switch.

According to an invention of claim 2, in the saddle-riding type vehicle according to claim 1, in the push start control mode, the control unit applies the clutch to start the engine and thereafter releases the clutch.

According to an invention of claim 3, in the saddle-riding type vehicle according to claim 1, the switch is a cutoff switch which permits the engine to operate in an OFF state and which does not permit the engine to operate in an ON state.

According to an invention of claim 4, in the saddle-riding type vehicle according to claim 3, the control unit applies the clutch to start the engine when the switch state detection portion detects a change in state of the switch from the ON state to the OFF state.

According to an invention of claim 5, in the saddle-riding type vehicle according to claim 1, the control unit further includes a load detection portion which detects whether or not a load of a predetermined value or greater is applied to a seat, and the control unit applies the clutch to start the engine when the load detection portion detects that a predetermined load or greater is applied to the seat.

According to an invention of claim 6, in the saddle-riding type vehicle according to claim 5, the load detection portion executes a detection using a seat switch which is provided in a lower portion of the seat.

According to an invention of claim 7, in the saddle-riding type vehicle according to claim 1, the control unit further includes a side stand position detection portion which detects a standing state and a stored state of a side stand, and the control unit proceeds to the push start control mode when the side stand position detection portion detects that the side stand is in the stored state.

Advantage of the Invention

According to the invention of claim 1, the control unit proceeds to the push start control mode when the engine stopped state detection portion detects the stopped state of the engine, the vehicle stopped state detection portion detects the stopped state of the saddle-riding type vehicle, and the gear selected state detection portion detects the state in which any one of the gears of the transmission is selected, and in the push start control mode, the control unit applies the clutch to start the engine when the vehicle speed detection portion detects the predetermined vehicle speed or faster and the switch state detection portion detects the change in state of the switch. By doing so, even in the vehicle including the automatic clutch mechanism configured to be activated by the actuator, the push start can be executed, thereby making it possible to start the engine even when the charged capacity of the battery is reduced.

According to the invention of claim 2, in the push start control mode, since the control unit engages the clutch to start the engine and thereafter releases the clutch, it is possible to prevent the vehicle from being started irrespective of the intention of the rider.

According to the inventions of claims 3 and 4, since the switch is the cutoff switch which permits the operation of the engine in the OFF state and which does not permit the operation of the engine in the ON state, an existing switch can be made use of without providing a separate switch for executing the push start control mode, thereby making it possible to provide the simple and inexpensive configuration.

According to the invention of claim 5, since the control unit applies the clutch to start the engine further when the load detection portion detects that the predetermined load or greater is applied to the seat, it is possible to prevent the vehicle from being started without an intention of the rider as when the vehicle is started before the rider rides on the vehicle. In addition, since the control unit applies the clutch to start the engine in such a state that the load is exerted on the wheel, it is possible to prevent the wheel from spinning, making it easy to transmit power to the engine, whereby the push start operation by the rider can be assisted.

According to the invention of claim 6, since the load detection portion executes a detection using the separate switch which is provided in the lower portion of the seat, the load detection portion can be made simple in configuration and inexpensive in cost.

According to the invention of claim 7, since the control unit proceeds to the push start control mode further when the side stand position detection portion detects that the side stand is in the stored state, it is possible to prevent the engine from being started when the side stand still remains standing.

MODE FOR CARRYING OUT THE INVENTION

Hereinafter, an embodiment of a saddle-riding type vehicle of the invention will be described based on the accompanying drawings. The drawings should be seen in a direction in which given reference numerals look properly. In the following description, front, rear, left, right, up and down denote accordingly directions as seen from a rider of a vehicle. The front, rear, left, right, up and down sides of the vehicle are denoted by Fr, Rr, L, R, U and D, respectively.

Figure 1:
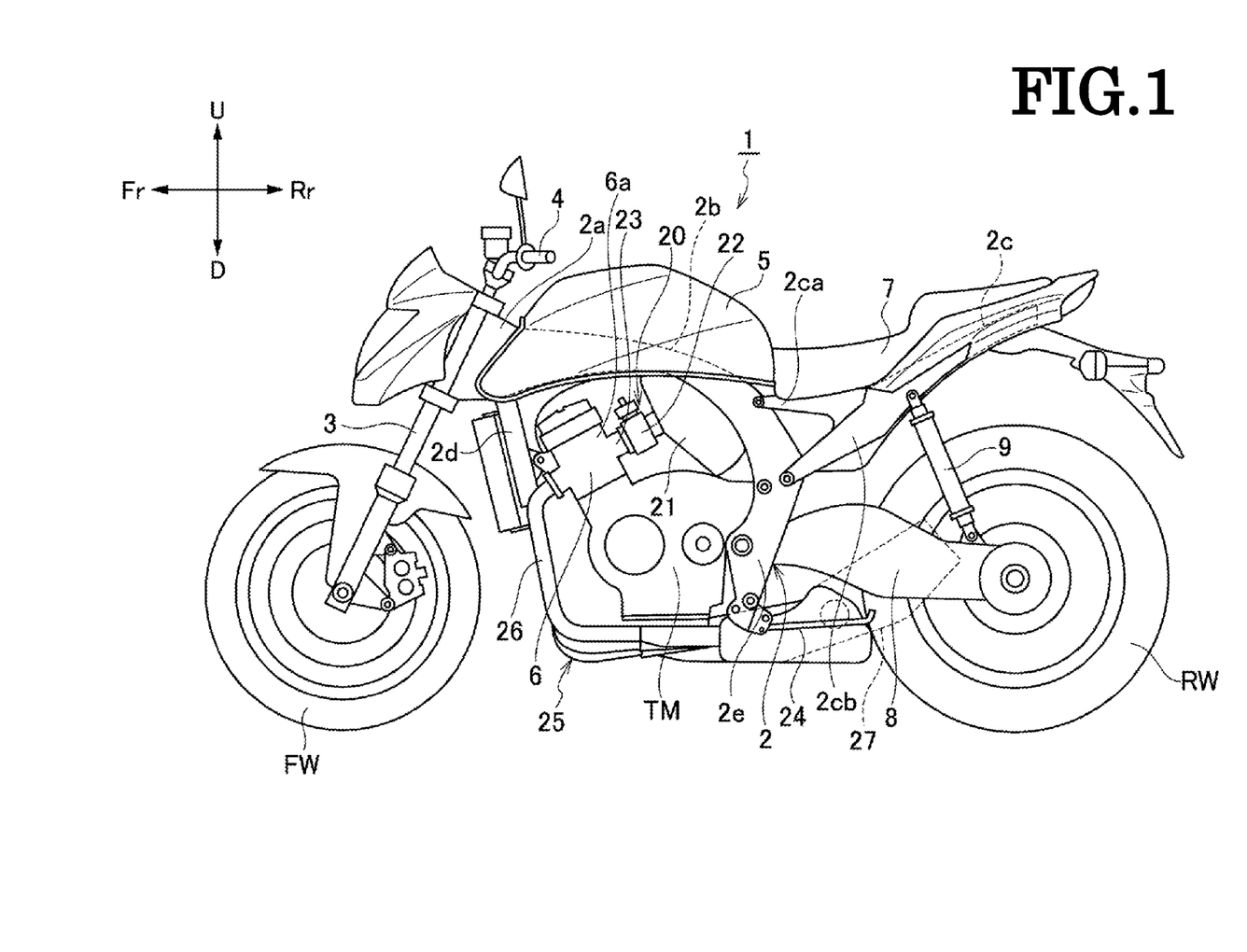
FIG. 1 is a side view of a saddle-riding type vehicle according to an embodiment of the invention.

In FIG. 1, a body frame 2 of a saddle-riding type vehicle 1 which is a motorcycle includes a front fork 3 which supports a front wheel FW rotatably and a headstock 2a which supports a handlebar 4 so as to turn, a main frame 2b which extends rearwards and downwards from the headstock 2a, a pair of left and right sub-frames 2c which are provided continuously to the main frame 2b, a down frame 2d which is provided continuously to a front end portion of the main frame 2b and which extends rearwards and downwards at a steeper angle than the angle at which the main frame 2b extends rearwards and downwards, and a pivot frame 2e which is connected to a rear end portion of the main frame 2b. A drive unit made up of an engine 6 and a transmission TM is disposed at a lower portion of the main frame 2b and ahead of the pivot frame 2e. This drive unit is mounded on the body frame 2 so as to be surrounded by the main frame 2b, the down frame 2d and the pivot frame 2e and is supported by a lower end portion of the down frame 2d and the pivot frame 2e.

A fuel tank 5 is mounted above the engine 6 and on the main frame 2b, and a tandem-type seat 7 which is disposed at the rear of the fuel tank 5 is supported by the sub-frames 2c.

The sub-frames 2c have seat rail portions 2ca which are provided so as to continue to a middle portion of the main frame 2b at front end portions thereof and which extend to the rear from the main frame 2b and rear frame portions 2cb which extend forwards and downwards from middle portions of the seat rail portions 2ca in a front-and-rear direction so as to continue to the pivot frame 2e and are formed substantially into a Y-like shape when seen from a side.

A front end portion of a swing arm 8 which supports rotatably the rear wheel RW at a rear end portion thereof is supported on the pivot frame 2e so as to swing, and rear cushions 9 are provided individually between end portions of the left and right sub-frames 2c and the swing arm 8.

An intake system 20 is connected to a rear side surface of a cylinder head 6a, and this intake system 20 includes an air cleaner 21, a throttle body 22 which is connected to the air cleaner 21, and an intake pipe 23 which extends between the throttle body 22 and the cylinder head 6a to connect thereto. An exhaust system 25 is connected to a front side surface of the cylinder head 6a and includes an exhaust pipe 26 which extends from the front side surface of the cylinder head 6a to the rear after passing below the engine 6 and an exhaust muffler 27 which is disposed on a right-hand side of the rear wheel RW so as to extend obliquely upwards and rearwards to connect to a downstream end of the exhaust pipe 26.

A side stand 24 is attached to a central lower portion of the body frame 2 so as to be rotated to a standing state and a stored state. A side stand switch 24a (refer to FIG. 3) is provided at a proximal portion of the side stand 24, and this side stand switch 24a becomes on when the side stand 24 is in the standing state.

Further, a seat switch 7a (refer to FIG. 3) is disposed under the seat 7, and this seat switch 7a is switched on due by the weight of a rider when the rider sits on the seat 7, and a control unit 10 (refer to FIG. 3), which is a control device, is also disposed under the seat 7. The control unit 10 is electrically connected to sensors and switches so that signals from the sensors and switches are inputted into the control unit 10.

In the saddle-riding type vehicle 1 which is configured in the way described above, power from the engine 6 is transmitted from the transmission TM having a plurality of speed gears to the rear wheel RW by way of a chain, not shown.

Figure 2:
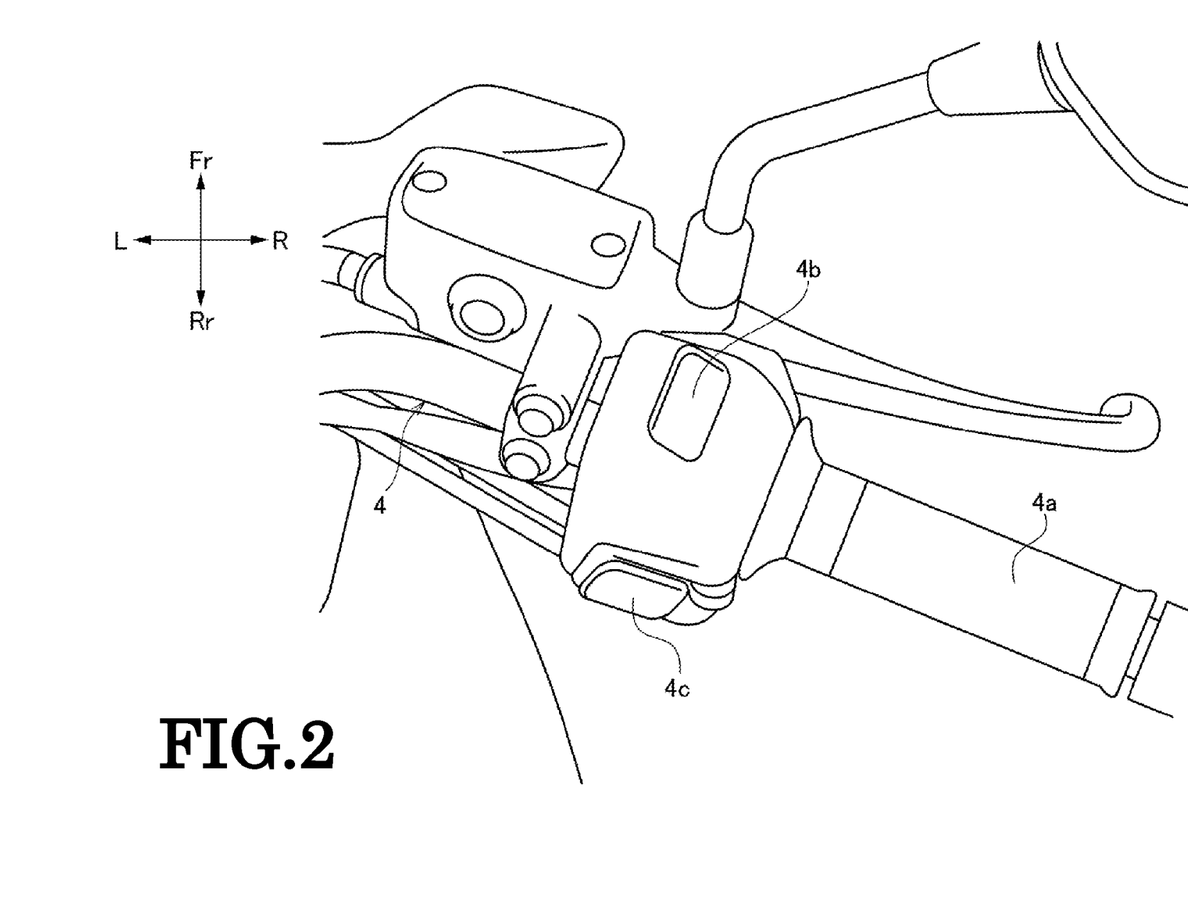
FIG. 2 is a perspective view of a handlebar when seen from obliquely thereabove.

FIG. 2 is a perspective view of a handlebar 4 when seen from obliquely thereabove.

A cutoff switch 4b is disposed near a proximal portion of a grip portion 4a which is situated at a right side of the handlebar 4, and a starter switch 4c is disposed at the rear of the cutoff switch 4b. The cutoff switch 4b is a so-called engine stop switch which permits the operation (including the start) of the engine 6 in an OFF state and which does not permit the operation (including the start) of the engine 6 in an ON state.

Figure 3:
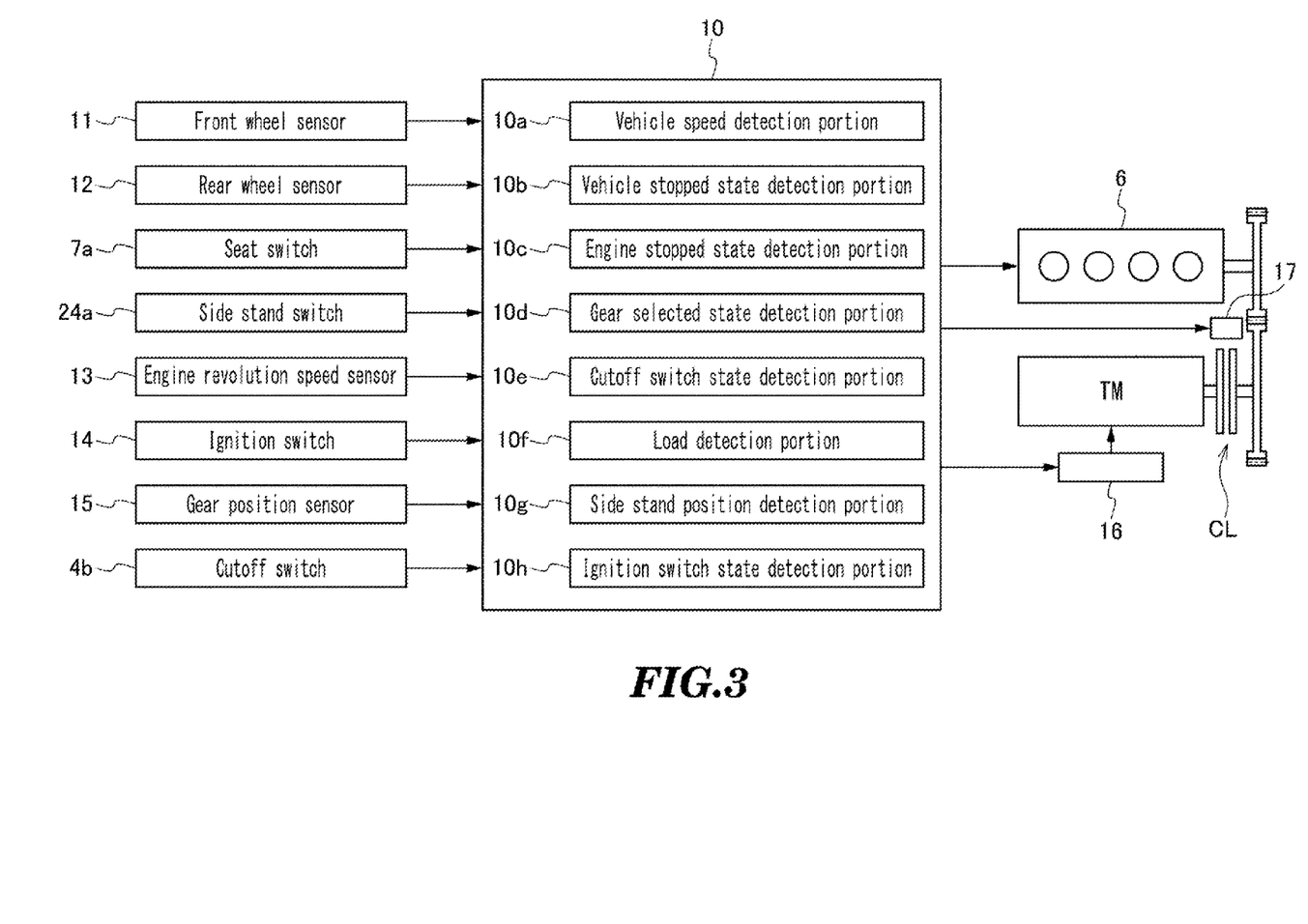
FIG. 3 is a block diagram showing the configuration of an automatic clutch mechanism.

FIG. 3 is a block diagram showing the configuration of an automatic clutch mechanism.

As shown in FIG. 3, the automatic clutch mechanism has a clutch CL between the engine 6 and the transmission TM which is provided on the power transmission line which extends between the engine 6 and the rear wheel RW. The transmission TM is configured to change combinations of gears to be engaged by a shift actuator 16.

The clutch CL is controlled to be released and applied by a clutch actuator 17. When released, the clutch CL disconnects the power transmission line between the engine 6 and the rear wheel RW, while when applied, the clutch CL connects the power transmission line between the engine 6 and the rear wheel RW. The clutch CL may be a normally open clutch which is normally open in its normal state where the clutch CL is not operated or may be a normally closed clutch which is normally applied in its normal state where the clutch CL is not operated. However, the clutch CL will be described as being the normally open clutch.

In addition, the shift actuator 16 which selects the gears of the transmission TM and the clutch actuator 17 which controls the clutch CL to be released and applied are driven based on control signals from the control unit 10.

The control unit 10 includes a vehicle speed detection portion 10a, a vehicle stopped state detection portion 10b, an engine stopped state detection portion 10c, a gear selected state detection portion 10d, a cutoff switch state detection portion 10e, a load detection portion 10f, a side stand position detection portion 10g, and an ignition switch state detection portion 10h. A front wheel sensor 11, a rear wheel sensor 12, the seat switch 7a, the side stand switch 24a, an engine revolution speed sensor 13, an ignition switch 14, a gear position sensor 15, and the cutoff switch 4b are electrically connected to the control unit 10, so that signals from these sensors and switches are configured to be inputted into the control unit 10.

The front wheel sensor 11 is disposed near the front wheel FW to detect a rotation speed of the front wheel FW which is a steered wheel. The rear wheel sensor 12 is disposed near the rear wheel RW which is a drive wheel to detect a rotation speed of the rear wheel RW. The vehicle speed detection portion 10a of the control unit 10 obtains a vehicle speed of the saddle-riding type vehicle 1 from signals from the front wheel sensor 11 and the rear wheel sensor 12, and the vehicle stopped state detection portion 10b of the control unit 10 obtains a stopped state of the saddle-riding type vehicle 1 from signals from the front wheel sensor 11 and the rear wheel sensor 12. The vehicle speed detection portion 10a and the vehicle stopped state detection portion 10b of the control unit 10 may estimate a vehicle speed and a stopped state of the saddle-riding type vehicle 1 by obtaining a vehicle speed related value such as a gear rotation speed or the like from a rotation sensor which is provided on an output gear or the like of the transmission TM.

The engine revolution speed sensor 13 is disposed near a crankshaft, not shown, of the engine 6 and is configured to detect a rotation speed of the crankshaft. The engine stopped state detection portion 10c of the control unit 10 calculates an engine revolution speed NE of the saddle-riding type vehicle 1 from a signal from the engine revolution speed sensor 13 to thereby detect a stopped state of the engine 6.

The ignition switch 14 is disposed on the handlebar 4 or near the handlebar 4 and can be operated to an ON state by a key in which the engine can be started. The ignition switch state detection portion 10h of the control unit 10 detects an ON-OFF state of the ignition switch 14 from a signal from the ignition switch 14.

The gear position sensor 15 is configured to detect a speed gear of the transmission TM by detecting a rotational angle of a shift drum, not shown. The gear selected state detection portion 10d of the control unit 10 detects a connected state of gears of the transmission TM from a signal from the gear position sensor 15.

The cutoff switch state detection portion 10e of the control unit 10 detects an ON-OFF state of the cutoff switch 4b from a signal from the cutoff switch 4b.

The load detection portion 10f of the control unit 10 detects an ON-OFF state of the seat switch from a signal from the seat switch 7a. The side stand position detection portion 10g of the control unit 10 detects a standing state or a stored state of the side stand switch from a signal from the side stand switch 24a.

Figure 4:
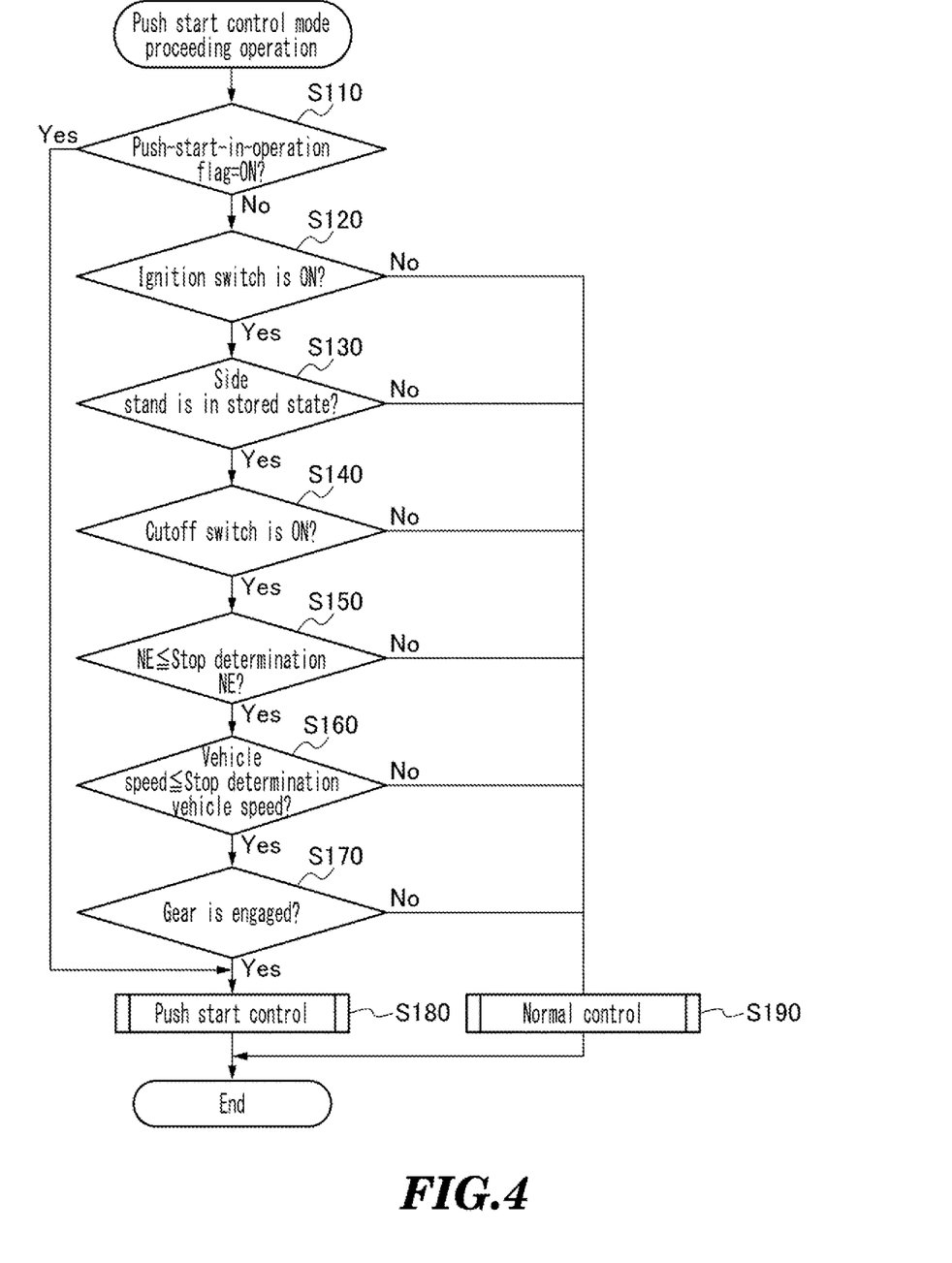
FIG. 4 is a flowchart showing a push start control mode proceeding operation.

FIG. 4 is a flowchart showing a push start control mode proceeding operation.

Firstly, in step 110, it is determined whether or not a flag indicating that a push start is in operation or a push-startin-operation flag is ON. If it is determined in step 110 that the push-start-in-operation flag is ON, the push start control mode proceeding operation proceeds to a push start control in step 180. If it is determined in step 110 that the push-start-in-operation flag is not ON, that is, the push-start-in-operation flag is OFF, the push start control mode proceeding operation proceeds to step 120.

In step 120, it is determined whether or not the ignition switch 14 is ON. Then, if it is determined in step 120 that the ignition switch 14 is ON, the push start control mode proceeding operation proceeds to step 130.

In step 130, it is determined whether or not the side stand 24 is in a stored state. If it is determined in step 130 that the side stand 24 is in the stored state, the push start control mode proceeding operation proceeds to step 140.

In step 140, it is determined whether or not the cutoff switch 4b is ON. This is because the cutoff switch 4b is used as a switch for executing the push start control mode. Then, if it is determined in step 140 that the cutoff switch 4b is ON, the push start control mode proceeding operation proceeds to step 150.

In step 150, it is determined whether or not the engine revolution speed NE is equal to or slower than a stop determination revolution speed (a stop determination NE). Then, if it is determined in step 150 that the engine revolution speed NE is equal to or slower than the stop determination revolution speed, it is determined that the engine 6 is in a stopped state. If it is determined that the engine 6 is in the stopped state, the push start control mode proceeding operation proceeds to step 160.

In step 160, it is determined whether or not the vehicle speed of the saddle-riding type vehicle 1 is equal to or slower than a stop determination vehicle speed. Then, if it is determined in step 160 that the vehicle speed of the saddle-riding type vehicle 1 is equal to or slower than the stop determination vehicle speed, it is determined that the saddle-riding type vehicle is in a stopped state. If it is determined in step 160 that the saddle-riding type vehicle 1 is in the stopped state, the push start control mode proceeding operation proceeds to step 170.

In step 170, a gear selected state of the transmission TM is detected to determine whether or not a gear other than a neutral and reverse gears which enables a push start is engaged. Then, if it is determined in step 170 that the gear is engaged, the push start control mode proceeding operation proceeds to the push start control mode in step 180. If the determinations made in step 120 to step 170 are negative or No, the push start control mode proceeding operation proceeds to a normal control mode in step 190.

Figure 5:
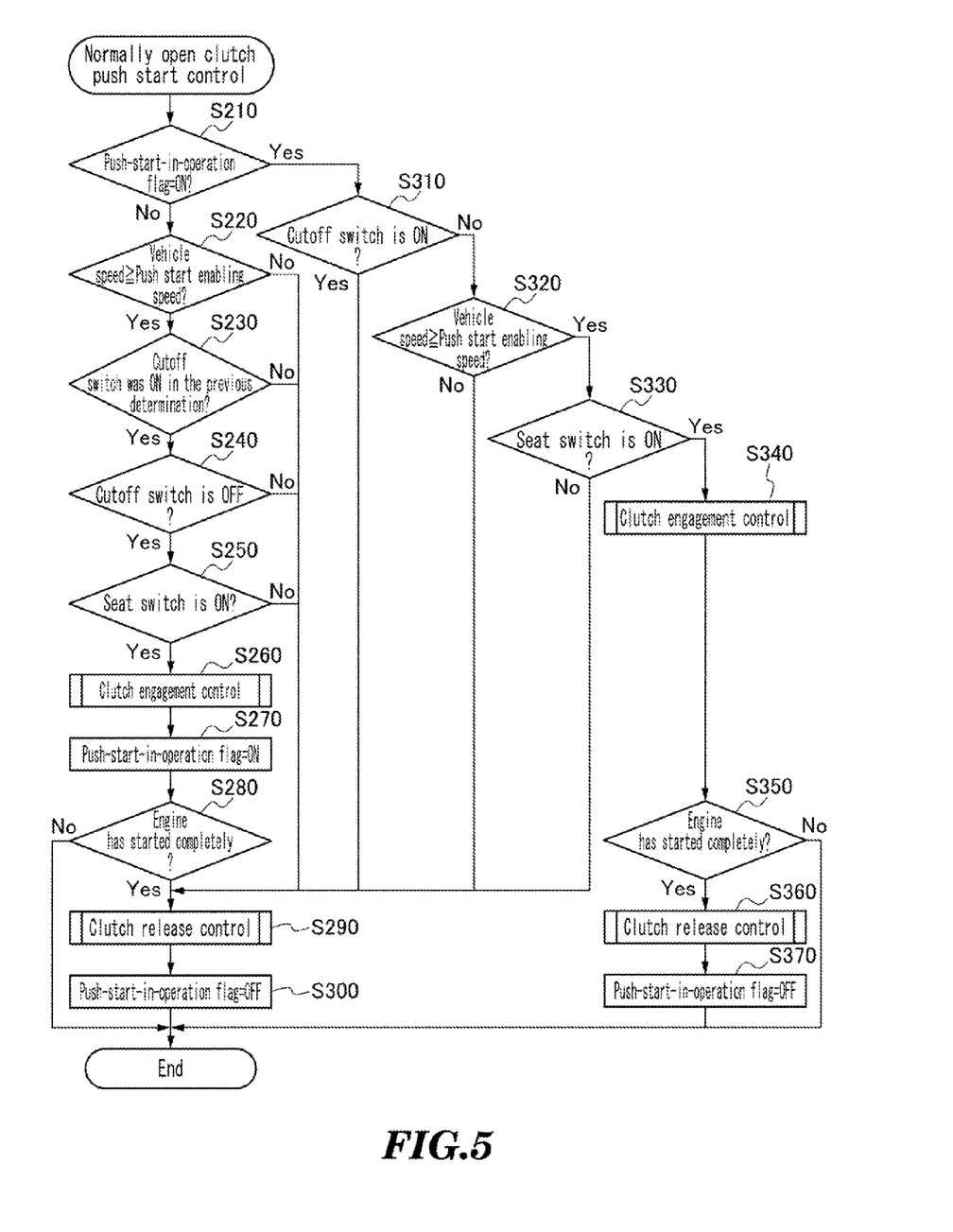
FIG. 5 is a flowchart showing a push start control mode operation of a normally open clutch.

FIG. 5 is a flowchart showing a push start control mode operation of a normally open clutch.

Firstly, in step 210, it is determined whether or not a flag indicating that a push start is in operation or a push-start-in-operation flag is ON. Then, if it is determined in step 210 that the push-start-in-operation flag is not ON, the push start control mode operation proceeds to step 220.

In step 220, it is determined whether or not the vehicle speed of the saddle-riding type vehicle 1 is equal to or faster than a push start enabling vehicle speed. This is because there is an intention to wait for the vehicle speed of the saddle-riding type vehicle 1 to reach a speed which is good enough to enable a push start as a result of the rider push propelling the saddle-riding type vehicle 1. Then, if the vehicle speed of the saddle-riding type vehicle 1 is raised to reach or exceed the push start enabling vehicle speed, the push start control mode operation proceeds to step 230.

In step 230, it is determined whether or not the cutoff switch 4b was on in the previous determination. Then, if it is determined in step 230 that the cutoff switch 4b was on in the previous determination, the push start control mode operation proceeds to step 240.

In step 240, it is determined whether or not the cutoff switch 4b is OFF. This is because in the event that the rider executes a push start and determines that the vehicle speed of the saddle-riding type vehicle 1 reaches or exceeds a vehicle speed which enables a push start, it should be detected whether or not the rider switches off the cutoff switch 4b which triggers an engine start on the saddle-riding type vehicle 1 by push propelling the saddle-riding type vehicle 1 by the rider. Then, if it is determined in step 240 that the cutoff switch 4b is OFF, the push start control mode operation proceeds to step 250.

In step 250, it is determined whether or not the seat switch 7a is ON, that is, whether or not the rider sits on the seat 7. If it is determined in step 250 that the rider sits on the seat 7, in step 260, a clutch engagement control is executed to engage the clutch CL so as to establish a connection from the rear wheel RW to the crankshaft, whereby the rotation of the rear wheel RW is transmitted to the crankshaft. Following this, the push-start-in-operation flag becomes on in step 270.

Following this, it is determined in step 280 whether or not the engine 6 has completely been started. If it is determined in step 280 that the engine 6 has completely been started, a clutch release control is executed in step 290, whereupon the clutch CL is released immediately. This prevents the occurrence of an unintentional drastic running of the saddle-riding type vehicle 1 immediately after the engine 6 is started. Following this, the push-start-in-operation flag becomes on in step 300.

If the determinations made in step 220 to step 250 are negative or No, the clutch release control is executed in step 290, and the clutch CL is released without starting the engine.

If it is determined in step 210 that the push-start-in-operation flag is ON, it is determined in step 310 whether or not the cutoff switch 4b is ON. If it is determined in step 310 that the cutoff switch 4b is not ON, it is determined in step 320 whether or not the vehicle speed of the saddle-riding type vehicle 1 is equal to or faster than the push start enabling speed. If it is determined in step 320 that the vehicle speed of the saddle-riding type vehicle 1 is equal to or faster than the push start enabling speed, it is determined in step 330 whether or not the seat switch 7a is ON. If it is determined in step 330 that the seat switch 7a is ON, the clutch engagement control is executed in step 340. Following this, it is determined in step 350 whether or not the engine 6 has completely been started. If it is determined in step 350 that the engine 6 has completely been started, the clutch release control is executed in step 360, whereupon the clutch CL is released immediately. Following this, the push-start-in-operation flag becomes off in step 370.

With the cutoff switch 4b determined to be on in step 310, if the determinations made in step 320 to step 330 are negative or No, the clutch release control is executed in step 290, whereby the clutch CL is released without starting the engine.

Thus, as has been described heretofore, according to the saddle-riding vehicle 1 of this embodiment, the control unit 10 proceeds to the push start control mode when the engine stopped state detection portion 10c detects the stopped state of the engine, the vehicle stopped state detection portion 10b detects the stopped state of the saddle-riding type vehicle 1, and the gear selected state detection portion 10d detects the state in which any one of the gears of the transmission TM is selected, and in the push start control mode, the control unit 10 applies the clutch CL to start the engine 6 when the vehicle speed detection portion 10a detects the predetermined vehicle speed or faster and the cutoff switch state detection portion 10e detects the change in state of the cutoff switch 4b. By doing so, even in the saddle-riding type vehicle 1 including the automatic clutch mechanism, the push start can be executed, thereby making it possible to start the engine 6 even when the charged capacity of the battery is reduced.

In addition, in the push start control mode, since the control unit 10 engages the clutch CL to start the engine 6 and thereafter disengages the clutch CL, it is possible to prevent the vehicle from being started irrespective of the intention of the rider.

Additionally, since the cutoff switch 4b is the cutoff switch which permits the start of the engine 6 in the OFF state and which does not permit the start of the engine 6 in the ON state, an existing switch can be made use of without providing a separate switch for executing the push start control mode, thereby making it possible to provide the simple and inexpensive configuration.

Since the control unit 10 applies the clutch CL to start the engine 6 further when the load detection portion 10f detects that the predetermined load or greater is applied to the seat 7, it is possible to prevent the vehicle from being started without an intention of the rider as when the vehicle is started before the rider rides on the vehicle. In addition, since the control unit 10 applies the clutch CL to start the engine 6 in such a state that the load is exerted on the rear wheel RW, it is possible to prevent the rear wheel RW from spinning, making it easy to transmit power to the engine 6, whereby the push start operation by the rider can be assisted.

Since the load detection portion 10f executes a detection by making use of the seat switch 7a which is a simple on-off switch provided in the lower portion of the seat 7, the load detection portion 10f can be configured simple and inexpensive without using a complicatedly expensive sensor.

Since the control unit 10 proceeds to the push start control mode further when the side stand position detection portion 10g detects that the side stand 24 is in the stored state, it is possible to prevent the engine from being started when the side stand 24 still remains standing.

The invention is not limited to the embodiment which has been described heretofore and hence can be modified or improved as required.

For example, while in this embodiment, the clutch CL is described as being the normally open clutch which is disengaged in the normal state where the clutch CL is not operated, the clutch CL may be a normally closed clutch.

Figure 6:
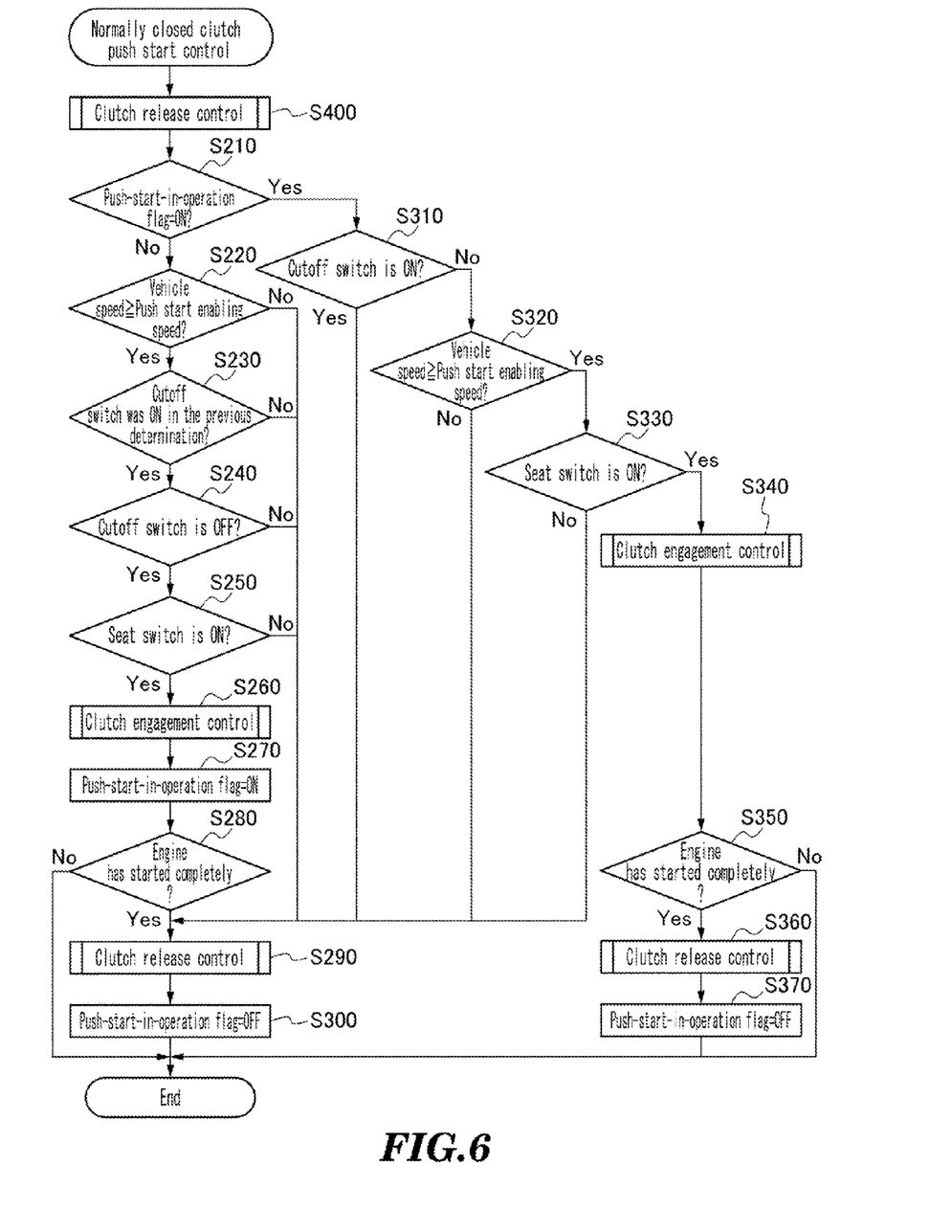
FIG. 6 is a flowchart showing a push start control mode operation of a normally closed clutch.

In the case of the clutch CL being a normally closed clutch, as shown in a flowchart in FIG. 6 which shows a push start control mode operation for a normally closed clutch, in an initial step 400, a clutch release control is executed to disengage the clutch CL. The other operations in the flow chart remain the same as those of the flowchart for the normally open clutch. By executing the operation in step 400, even with the normally closed clutch, the rider is allowed to push propel the saddle-riding type vehicle 1.

While in this embodiment, the clutch CL is described as being made up of a normal gear of one system and a clutch, a so-called dual clutch transmission may be used in which there are two systems of gears each having a clutch.

While in this embodiment, the switch which triggers a start of the engine when a push start is executed is described as being the cutoff switch which permits the start of the engine 6 in the OFF state and which does not permit the start of the engine 6 in the ON state, an exclusive switch for executing the push start control mode may be provided separately.

When the push start control mode is activated, a lamp may be illuminated or a monitor may display an indicator to indicate that the control has now proceeded to the push start control mode.

DESCRIPTION OF REFERENCE NUMERALS AND CHARACTERS

1 Saddle-riding type vehicle
4b Cutoff switch (Switch)
6 Engine
7 Seat
7a Seat switch
10 Control unit
10a Vehicle speed detection portion
10b Vehicle stopped state detection portion
10c Engine stopped state detection portion
10d Gear selected state detection portion
10e Cutoff switch state detection portion
10f Load detection portion
10g Side stand position detection portion
17 Clutch actuator (Actuator)
24 Side stand
CL Clutch
RW Rear wheel
TM Transmission

The invention claimed is:
1. A saddle-riding type vehicle (1), comprising:
an engine (6);
a rear wheel (RW);
a transmission (TM) which is provided on a power transmission line which extends between the engine (6) and the rear wheel (RW);
a clutch (CL) which is released or applied to disconnect or connect the power transmission line;
an actuator (17) which controls the release or application of the clutch (CL); and
a control unit (10) which controls the actuator (17) to release or apply the clutch (CL),
wherein the control unit (10) includes:
an engine stopped state detection portion (10c) which detects a stopped state of the engine (6);
a vehicle stopped state detection portion (10b) which detects a stopped state of the saddle-riding type vehicle (1);
a gear selected state detection portion (10d) which detects a state in which any one of gears of the transmission (TM) is selected;
a vehicle speed detection portion (10a) which detects a vehicle speed or a vehicle speed related value which is related to a vehicle speed; and
a switch state detection portion which detects an ON state or an OFF state of a switch (4b),
wherein the control unit (10) proceeds to a push start control mode when the engine stopped state detection portion (10c) detects a stopped state of the engine (6), the vehicle stopped state detection portion (10b) detects a stopped state of the saddle-riding type vehicle (1), and the gear selected state detection portion (10d) detects a state in which any one of the gears of the transmission (TM) is selected, and wherein in the push start control mode, the control unit (10) applies the clutch (CL) to start the engine (6) when the vehicle speed detection portion (10*a*) detects a predetermined vehicle speed or higher, and the switch state detection portion detects a change in state of the switch (4*b*).

2. The saddle-riding type vehicle (1) according to claim 1, wherein in the push start control mode, the control unit (10) applies the clutch (CL) to start the engine (6) and thereafter releases the clutch (CL).

3. The saddle-riding type vehicle (1) according to claim 1, wherein the switch (4*b*) is a cutoff switch (4*b*) which permits the engine (6) to operate in an OFF state and which does not permit the engine (6) to operate in an ON state.

4. The saddle-riding type vehicle (1) according to claim 3, wherein the control unit (10) applies the clutch (CL) to start the engine (6) when the switch state detection portion detects a change in state of the switch (4*b*) from the ON state to the OFF state.

5. The saddle-riding type vehicle (1) according to claim 1, wherein the control unit (10) further includes a load detection portion (10*f*) which detects whether or not a load of a predetermined value or greater is applied to a seat (7), and
wherein the control unit (10) applies the clutch (CI) to start the engine (6) when the load detection portion (10*f*) detects that a predetermined load or greater is applied to the seat (7).

6. The saddle-riding type vehicle (1) according to claim 5, wherein the load detection portion (10*f*) executes a detection using a seat switch (7*a*) which is provided in a lower portion of the seat (7).

7. The saddle riding type vehicle (1) according to claim 1, wherein the control unit (10) further includes a side stand position detection portion (10*g*) which detects a standing state and a stored state of a side stand (24), and
wherein the control unit (10) proceeds to the push start control mode when the side stand position detection portion (10*g*) detects that the side stand (24) is in the stored state.

* * * * *